United States Patent
Sato et al.

(10) Patent No.: US 6,189,749 B1
(45) Date of Patent: Feb. 20, 2001

(54) TIRE FIXING DEVICE

(75) Inventors: Yoshihiko Sato; Yasuyuki Shibata; Kazuhiko Maruyama, all of Saitama (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/346,926

(22) Filed: Jul. 2, 1999

(30) Foreign Application Priority Data

Jul. 2, 1998 (JP) .................................................. 10-187906

(51) Int. Cl.$^7$ .................................................. B62D 43/00
(52) U.S. Cl. .................................. 224/42.24; 224/42.12; 224/42.13; 224/42.26
(58) Field of Search ............................. 224/42.24, 42.12, 224/42.13, 42.14, 42.26; 248/225.11

(56) References Cited

U.S. PATENT DOCUMENTS

| | | | | |
|---|---|---|---|---|
| 1,297,942 | * | 3/1919 | Wahrenberger | 224/42.24 |
| 2,709,545 | * | 5/1955 | Cryer | 224/42.24 X |
| 3,428,230 | * | 2/1969 | Korf et al. | 224/42.24 X |
| 5,154,385 | * | 10/1992 | Linberg et al. | 248/225.1 |
| 5,845,825 | * | 12/1998 | Utsuno et al. | 224/42.24 |

* cited by examiner

Primary Examiner—Gregory M. Vidovich
Assistant Examiner—Maerena Brevard
(74) Attorney, Agent, or Firm—Sughrue, Mion, Zinn, Macpeak & Seas, PLLC

(57) ABSTRACT

A device for fixing a flat tire (30) in an automobile which has an accommodating space (5) behind a bucket seat (1) in which the bucket seat is accommodated which has been folded, comprises: a flat tire fixing threaded member (34); a vehicle body screw hole (20) which is located near the front edge of the accommodating space (5), and is threadably engaged with the threaded member (34); and a bracket (40) which has a first screw hole (42) which is threadably engaged with the vehicle body screw hole (20), and a second screw hole (44a) with which the flat tire fixing threaded member (34) is threadably engaged. In the case where the bucket seat is folded and accommodated, with the vehicle body screw hole 20 set in alignment with one of the bolt holes of the flat tire (30) the latter (30) is fixedly secured to the vehicle body screw hole (20) by means of the threaded member (34). In the case where the bucket set is held raised, with the first screw hole (42) of the bracket (40) set in alignment with the vehicle body screw hole (20) the bracket (40) is threadably engaged with the vehicle body (3), and thereafter with one of the bolt holds of the flat tire (30) set in alignment with the second screw hole (44a) of the bracket (40) the flat tire (30) is secured to the second screw hole (44a) by means of the threaded member (34).

4 Claims, 10 Drawing Sheets

TIRE FIXING DEVICE

BACKGROUND OF THE INVENTION

1. Technical Field of the Invention

This invention relates to a tire fixing device.

2. Discussion of the Prior Art

As shown in FIG. 13, generally, a space for accommodating a spare tire is provided behind a rear seat on an automobile; that is, a tire is fixedly accommodated in the space. There are available a variety of spare tire accommodating and fixing methods in the art. For instance, Japanese Utility Model Unexamined Publication No. Hei. 6-74589 has disclosed a spare tire carrier which is so designed that a spare tire is fixed with a locking element which is built in a center pole which penetrates the central hole of the wheel of the spare tire. Furthermore, Japanese Patent Unexamined Publication No. Hei. 10-81264 has disclosed a spare tire fixing device which comprises: a tightening member which is in the form of a shaft having the lower end portion which is threaded, and the upper end portion which is a screwing head; and a disk-shaped tire retainer which has a great step corresponding to the difference in width between a normal tire and a temporary tire between the lower end face and the lower surface of the flange of a cylindrical shaft section whose both ends are first and second annular receiving seat surfaces.

The above-described prior arts are spare tire fixing devices, not concerning the fixing of flat tires. A spare tire is generally smaller in width than a normal tire, and therefore it is impossible to accommodate a flat tire in the spare tire accommodating space. Hence, in general, until the vehicle arrives at a repair shop (station), the flat tire is left in the vehicle without being fixed. If a big object such as a tire is left in the vehicle without being fixed, then it may be unsteady in the traveling vehicle while rattling.

SUMMARY OF THE INVENTION

Accordingly, it is an object of the invention to provide a method of positively fixing a puncture tire (this is, a flat tire) not only when the bucket seat is held raised but also when it is folded, and a device for practicing the method.

The inventors have conducted intensive research on the securing of a vehicle tire, such as a flat tire, to a vehicle body, and, paying attention to the fact that, in an automobile, especially in a mini-van type automobile, the rear-most seat is folded and an accommodated, reached the present invention: That is, they have so modified the vehicle body that a screw hole for holding a flat tire fixing bracket by threadably engaging the latter is formed at the corner of a seat accommodating space provided behind the rearmost seat. Hence, (1) in the case where the rearmost seat is held raised, the bracket is threadably engaged with the screw hole, and the flat tire is secured to the bracket with a screw; and (2) in the case where the rearmost seat is accommodated in the space, the flat tire is secured directly to the screw hole with a screw. In both cases, the flat tire can be readily and positively secured.

That is, a flat tire fixing device for fixing a flat tire in an automobile which has a space behind a bucket seat in which the folded bucket seat is accommodated, according to the invention, comprises:

(a) a flat tire fixing threaded member adapted to fix the flat tire; and (b) a vehicle body screw hole which is located near the front edge of the accommodating space, and is threadably engaged with the threaded member.

It is preferable that the flat tire fixing device of the invention further comprises:

(c) a substantially L-shaped bracket which has a first screw hole which is threadably engaged with the vehicle body screw hole, and a second screw hole with which said flat tire fixing threaded member is threadably engaged, the first screw hole being formed in the horizontal section of the L-shaped bracket, the second screw hole being formed in the vertical section of the L-shaped bracket.

To an automobile having a space behind a bucket seat in which the bucket seat is accommodated after being folded, a flat tire is fixed as follows: In the case where the bucket seat is accommodated which has been folded, one of the bolt holes of the flat tire is set in alignment with the vehicle body screw hole, and the flat tire is threadably secured to the vehicle body screw hole with the threaded member. In the case where the bucket seat is held raised, a substantially L-shaped bracket is employed which has the horizontal section having the first screw hole and the vertical section having the second screw hole. With the first screw hole set in alignment with the vehicle body screw hole, the bracket is threadably secured to the vehicle body. Thereafter, one of the bolt holes of the flat tire is set in alignment with the second screw hole of the bracket, and the flat tire is secured to the second screw hole with the threaded member. In this connection, it is preferable that the lower end of the tread of the flat tire is in contact with the bottom surface of the accommodating space, and the upper end of the same is in contact with the rear surface of the backrest of the bucket seat.

The flat tire fixing device of the invention functions not only in the case where the bucket seat has been accommodated in the tire accommodating space but also in the case where it has been set raised. That is, in the case where the bucket seat has been accommodated, the bottom surface of the seat of the bucket seat is flush with the floor mat. Therefore, one of the bolt holes of the flat tire can be readily set in alignment with the vehicle body screw hole located near the front edge. Under this condition, the threaded member is threadably engaged with the vehicle body screw hole through the bolt hole of the flat tire, so that the latter can be positively secured. In the case where the bucket seat has been set raised, the tire accommodating space is opened, and therefore it can be utilized as it is. That is, the substantially L-shaped bracket is secured by threadably inserting the screw into the vehicle body screw hole, and with the screw hole formed in the vertical section of the bracket set in alignment with the bolt hole of the flat tire, the threaded member is threadably engaged with the screw hole until the flat tire is secured to the vertical section. In this case, the lower end of the tread of the flat tire is in contact with the bottom surface of the accommodating space, and the upper end of the same is in contact with the rear surface of the backrest. Therefore, the flat tire is positively fixed.

The nature, utility and principle of the invention will be more clearly understood from the following detailed description and the appended claims when read in conjunction with the accompanying drawings.

BRIEF DESCRIPTION OF THE DRAWING(S)

DETAILED DESCRIPTION OF THE INVENTION

A preferred embodiment of the invention will be described with reference to the accompanying drawings in detail.

Figure 13:
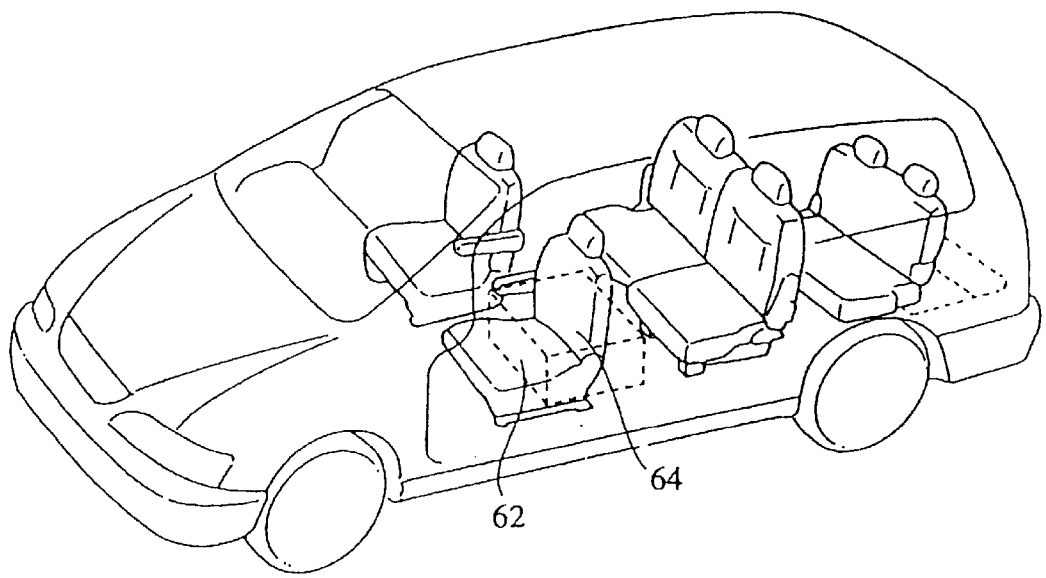
FIG. 13 is a perspective view outlining an automobile in which a rearmost seat accommodating space is provided behind the rearmost seat.
Figure 14:
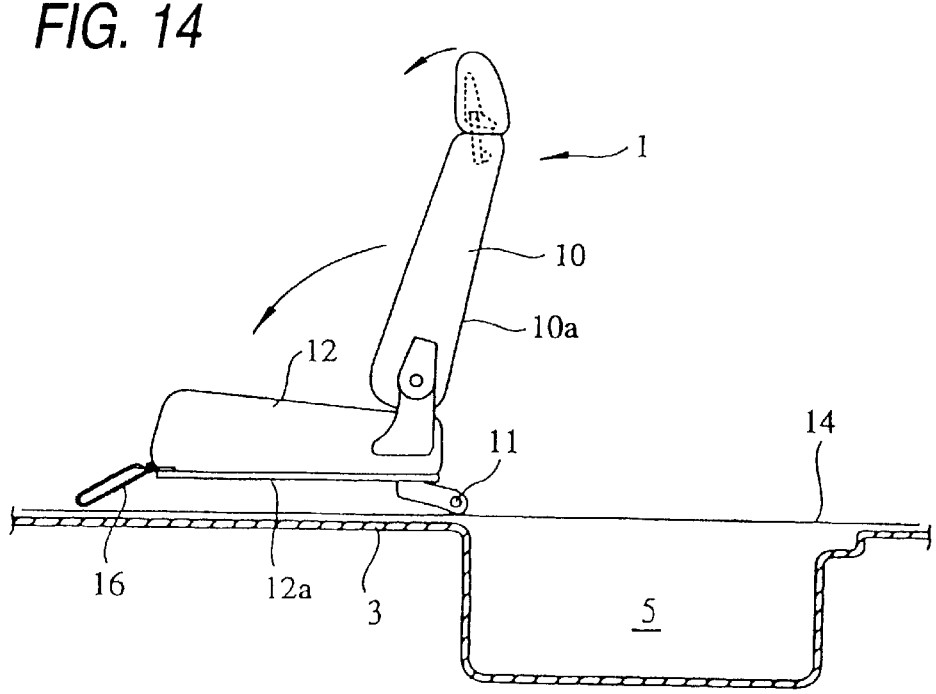
FIG. 14 is a sectional view showing a bucket seat set raised which is freely folded.
Figure 15:
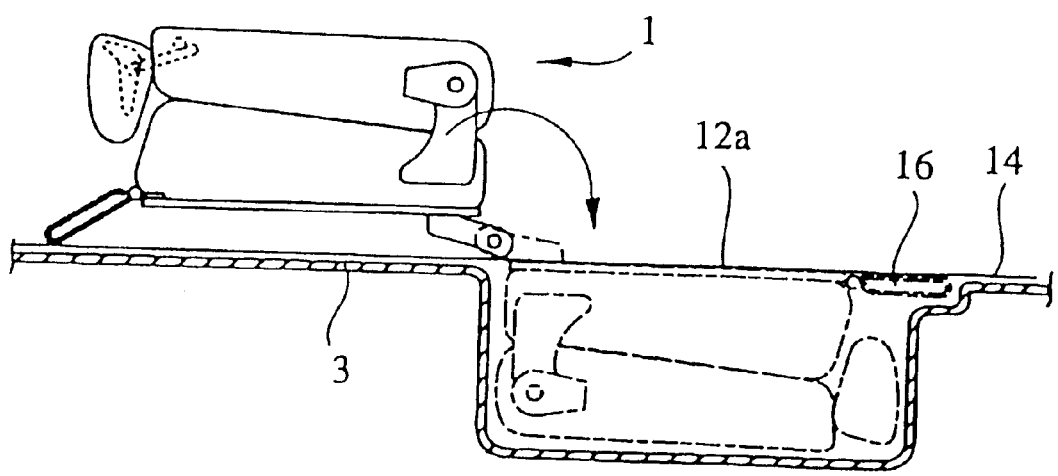
FIG. 15 is a sectional view showing the bucket seat which is folded and accommodated in the accommodating space.

Generally, in a mini-van type automobile, its rearmost bucket seat is foldable as shown in FIG. 13. Furthermore, as shown in FIG. 14, the backrest 10 of a rearmost seat 1 is folded forwardly, and then, as shown in FIG. 15, the whole backrest of the rearmost seat 1 together with the bench seat 12 is swung backwardly about a shaft 11, so that the whole rearmost seat is completely accommodated in an accommodating space 5 provided in the vehicle body 3.

The rearmost seat 1 is so designed that the bottom surface 12a of the bench seat 12 of the rearmost seat 1 is flush with a floor mat 14. Therefore, when the rearmost seat 1 has been accommodated completely as shown in FIG. 15, the bottom surface 12a of the bench seat 12 of the rearmost seat 1 is flush with the floor mat 14. In front of the bench seat 12 of the rearmost seat 1, a lid member 16 is provided which is used to completely close the accommodating space 5 when the folded rearmost seat 1 has been accommodated therein.

Figure 1:
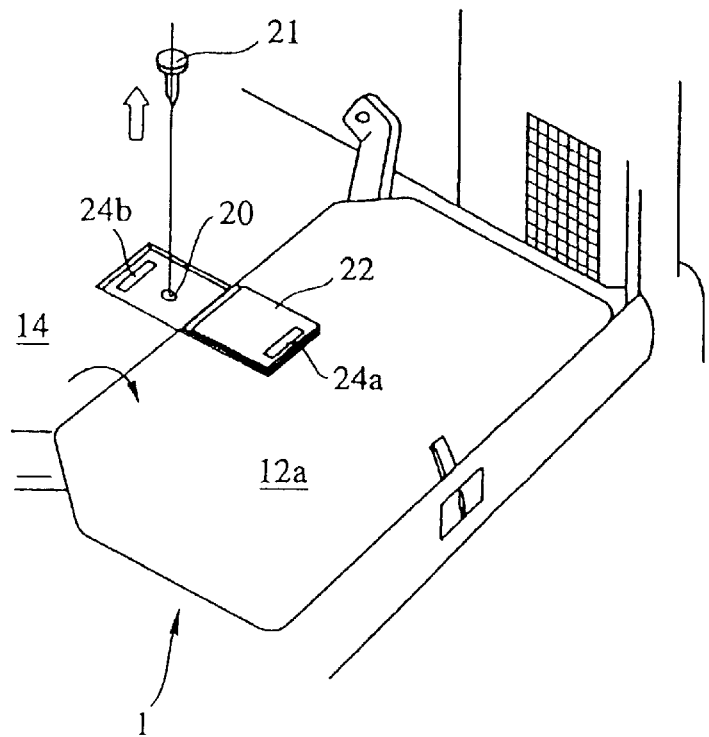
FIG. 1 is a perspective view outlining a part of an automobile having a vehicle body screw hole near the front edge of an accommodating space located behind a bucket seat in which the latter can be accommodated after being folded, in which the bucket seat is accommodated, and the flap of the floor mat which is located on the vehicle body screw hole is opened.

[1] In the case where the rearmost seat has been accommodated:

FIG. 1 shows the rearmost seat 1 (shown in FIGS. 13 through 15) which has been completely accommodated in the accommodating space. The part of the floor mat which surrounds a vehicle body screw hole 20 is cut U-shaped, thus serving as a flap 22 which can be swung. Fixing members 24a and 24b made of magic tape or the like are secured to the bottom of the flap 22 and the part of the vehicle floor which corresponds to the bottom of the flap, respectively. Normally, a pin 21 is inserted into the vehicle body screw hole 20. When the rearmost seat has been folded and accommodated in the accommodating space 5, the bottom surface 12a of the bench seat 12 of the rearmost seat 1 is flush with the floor mat 14.

Figure 2:
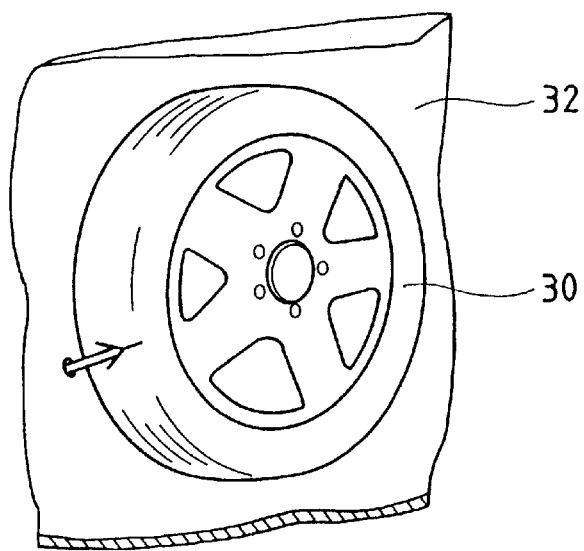
FIG. 2 is a perspective view showing a flat tire put in a plastic bag.

Mud and other dirt may often stick on the flat tire 30. Therefore, as shown in FIG. 2, it is preferable to put the tire 30 in a plastic bag 32. The bag 32 is made of transparent polyethylene or polypropylene sheet, and its mouth (opening) can be sealed up.

Figure 4:
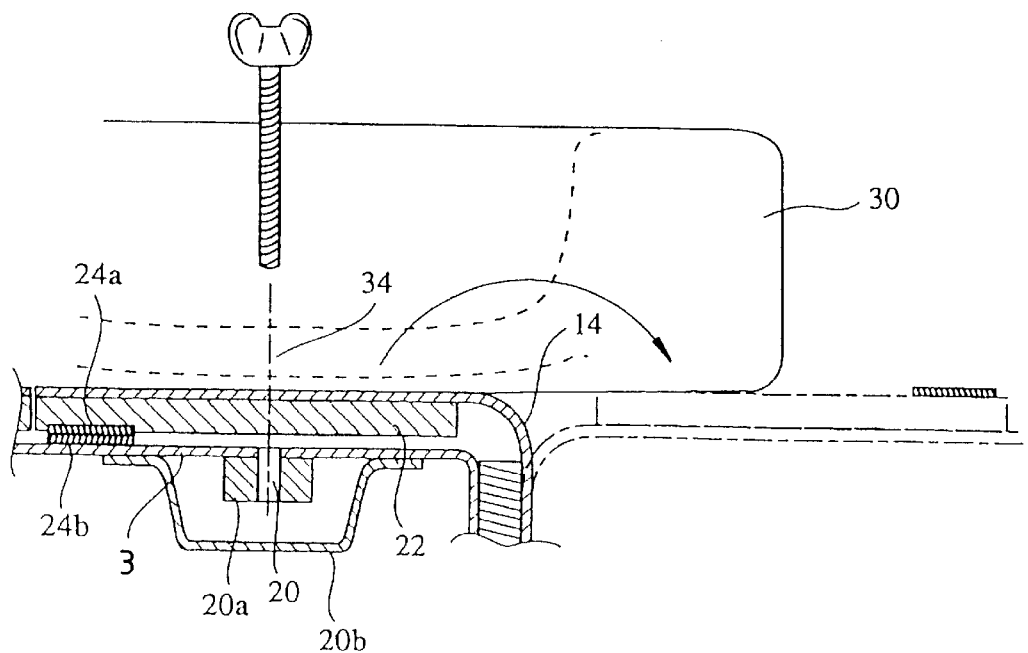
FIG. 4 is a fragmental sectional view showing a method of fixing a flat tire to the vehicle body screw hole with the threaded member.

The flap 22 of the floor 14, and the vehicle body screw hole 20 are as shown in FIG. 4 in detail. The vehicle body 3 has the screw hole 20. A nut 20a for providing a threaded support is welded to the rear of the screw hole 20 in order to reinforce the screw hole 20. A cup-shaped frame 20b is welded to the bottom surface of the vehicle body 3 in such a manner as to surround the screw hole 20.

Figure 3:
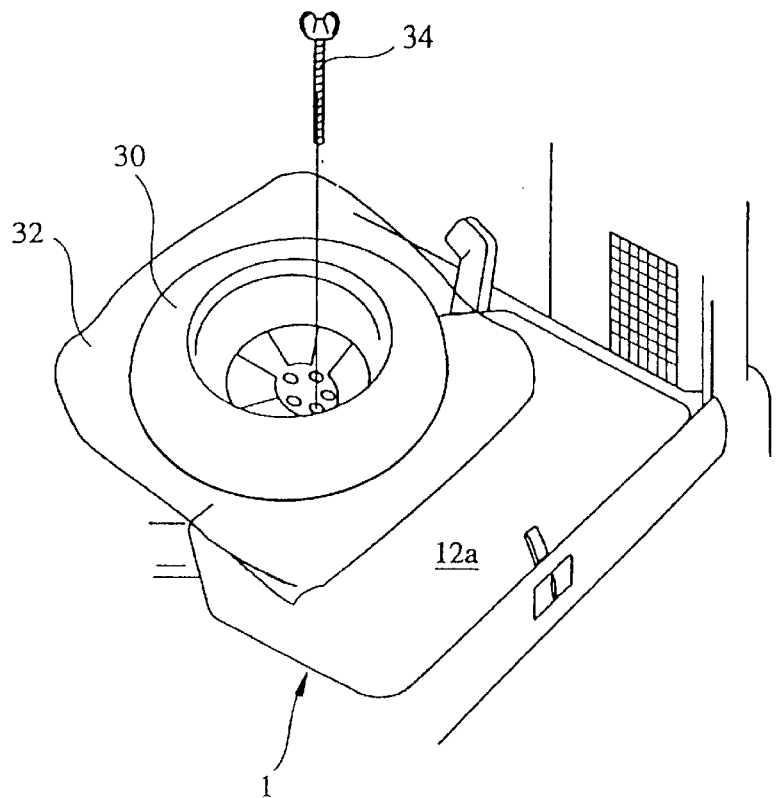
FIG. 3 is a perspective view showing the flat tire in the plastic bag which is going to be secured by threadably engaging a threaded member with the vehicle body screw hole.

The flat tire 30 put in the plastic bag 32 is fixed to the vehicle body screw hole 20 as follows: First, as shown in FIGS. 1 and 4, the flap 22 of the floor mat 14 covering the vehicle body screw hole 20 is opened, and then the flat tire 30 is set so that one of the bolt holes is in alignment with the vehicle body screw hole 20. Under this condition, as shown in FIG. 3, a screw member 34 is threadably engaged with the bolt hole of the flat tire 30 and the vehicle body screw hole 20. In order that this operation may be achieved with the hands, it is preferable that the threaded member 34 is a wing bolt.

Figure 5:
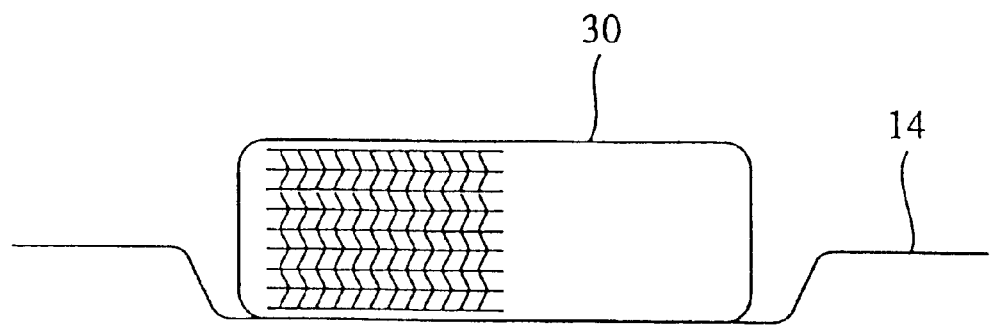
FIG. 5 is a side view showing a modification of a floor on which a flat tire is set.

FIG. 5 shows one modification of the vehicle floor which is so designed that, in order to positively fix the flat tire with the rearmost seat accommodated, a tire-shaped recess is formed in the floor in advance. This recess makes it simple to position the flat tire 30, and positively fixes the flat tire 30.

Figure 6:
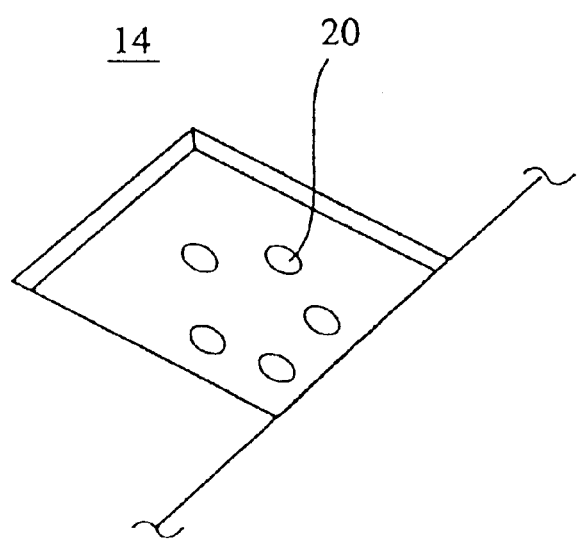
FIG. 6 is a perspective view showing a modification of the vehicle body screw hole.

FIG. 6 shows one modification of the vehicle body screw hole 20. In the modification, a plurality of screw holes are formed in the recess of the vehicle floor, so that, depending on the configuration of the flat tire 30, the tire 30 can be secured to a suitable one of the screw holes.

Figure 7:
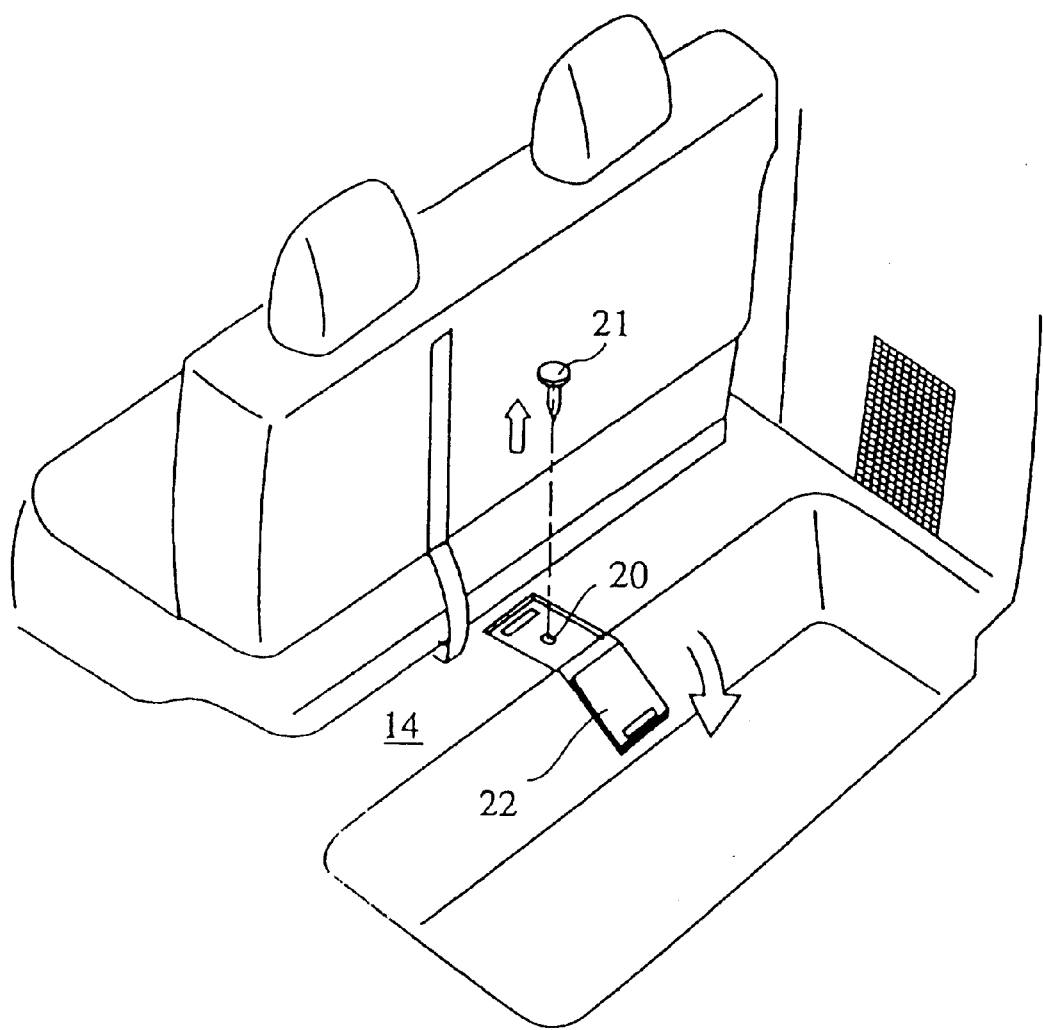
FIG. 7 is a perspective view showing the flap of the floor mat which is opened with the rear seat set raised.
Figure 8:
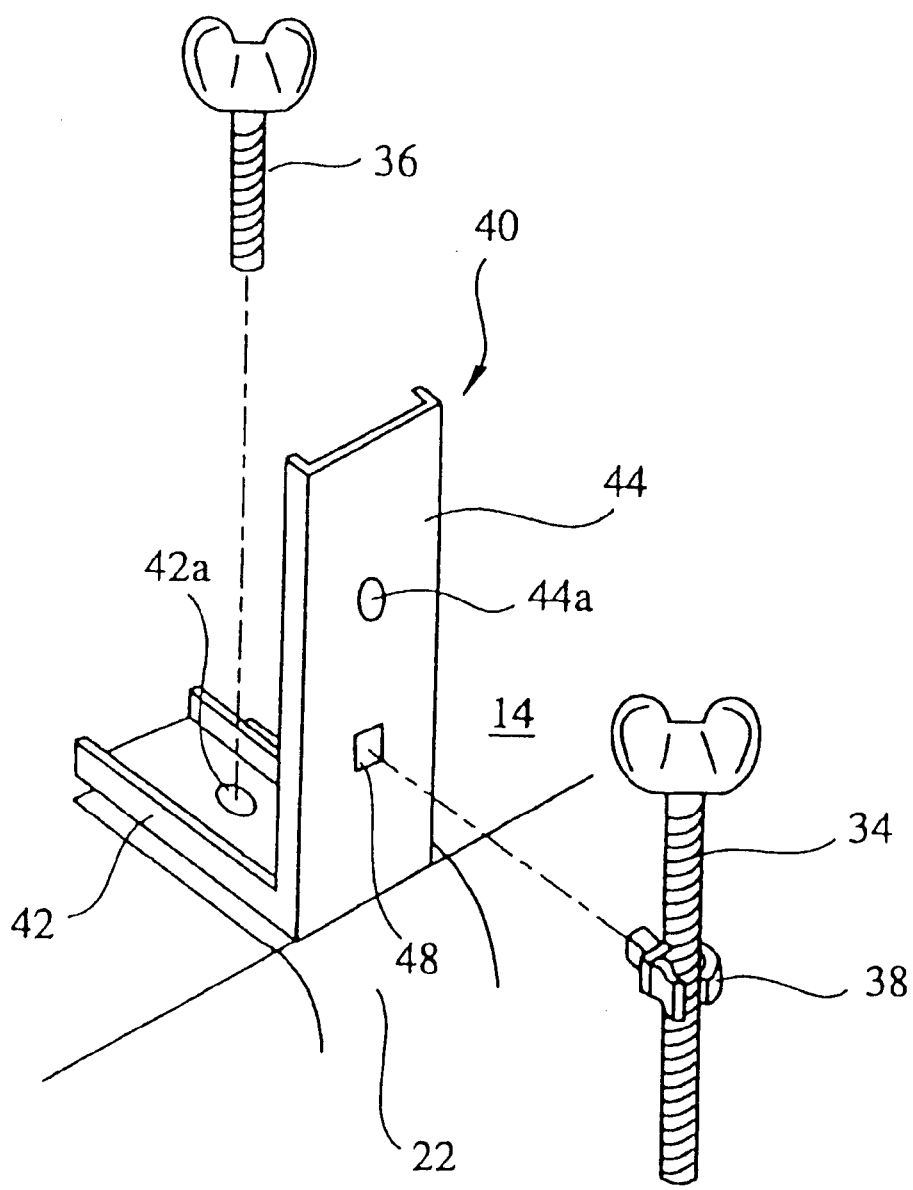
FIG. 8 is a perspective view showing a bracket secured to the vehicle body screw hole and a threaded member.
Figure 10:
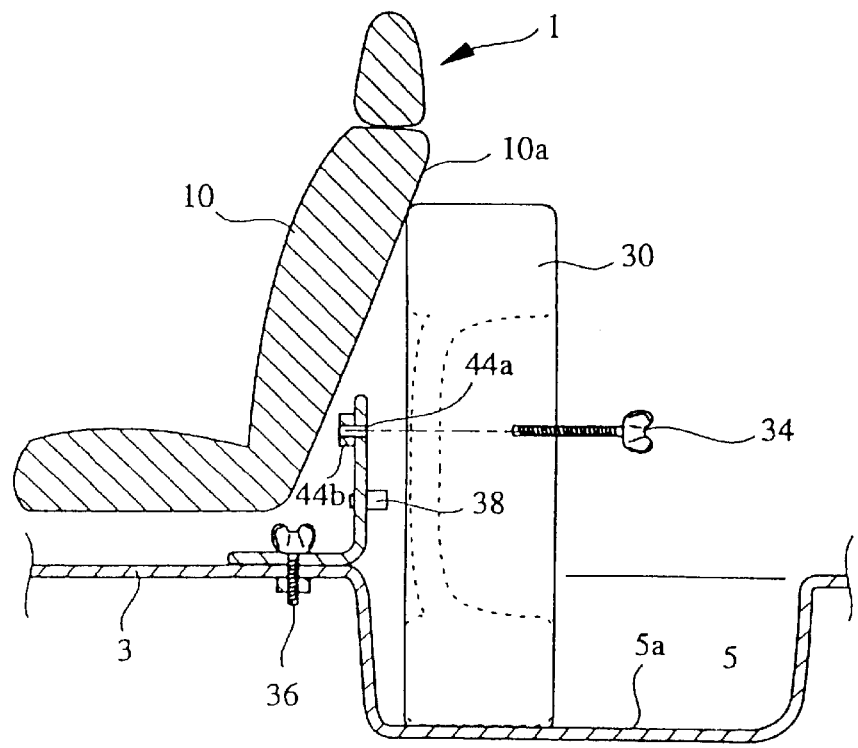
FIG. 10 is a sectional view showing the flat tire which is going to be fixed to the bracket with the threaded member which is secured to the vehicle body screw hole.

[2] In the case where the rearmost seat is set raised:

First, the flap 22 of the floor mat 14 is opened, as illustrated in FIG. 7, and the pin 21 is removed from the vehicle body screw hole 20. Thereafter, as illustrated in FIG. 8, a substantially L-shaped bracket 40 is secured to the vehicle body screw hole 20 with a threaded member 36. The L-shaped bracket 40 includes a horizontal section 42 having a first screw hole 42a, and a vertical section 44 having a second screw hole 44a. A nut 44b (having a threaded hole) (FIG. 10) for providing a thread support is welded to the second screw hole 44a. The vertical section 44 of the L-shaped bracket 40 has a hole 48 (in addition to the second screw hole 44a). It is preferable that the hole 48 is rectangular in section. A holding member 38 for fixing the threaded member 34 is fixedly inserted into the rectangular hole 48. In this embodiment, the holding member 38 is formed into an C-shaped arm shape for gripping the threaded member 34.

Figure 9:
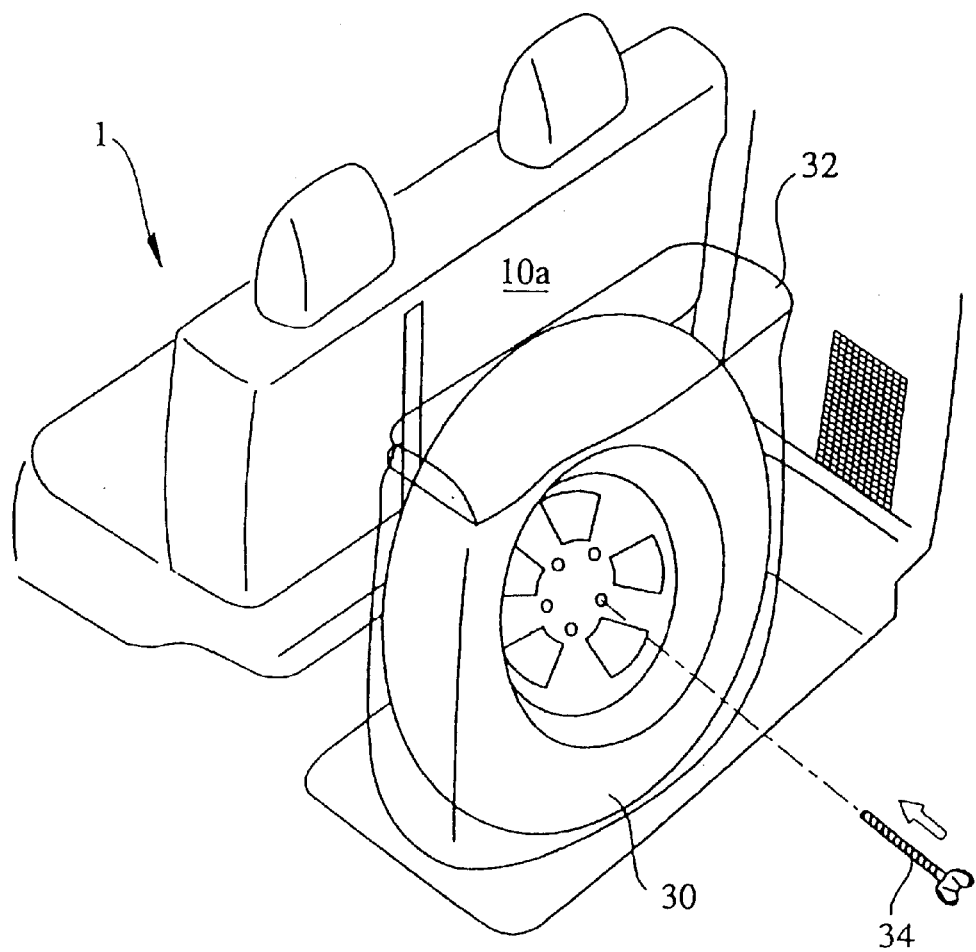
FIG. 9 is a perspective view showing a flat tire which is going to be fixed to the bracket with the threaded member which is secured to the vehicle body screw hole.

As shown in FIG. 9, one of the bolt holes of the flat tire 30 is set in alignment with the second screw hole 44a in the vertical section 44 of the L-shaped bracket 40, and the threaded member 34 is threadably engaged with the second screw hole 44a. In this case, it is preferable that the lower end of the tread of the flat tire 30 set upright is in contact with the bottom surface 5a (FIG. 10) of the accommodating space 5, while the upper end of the tread is in contact with the rear surface 10a of the backrest 10 of the rearmost seat 1; that is, the flat tire 30 is fixedly secured.

Figure 11:
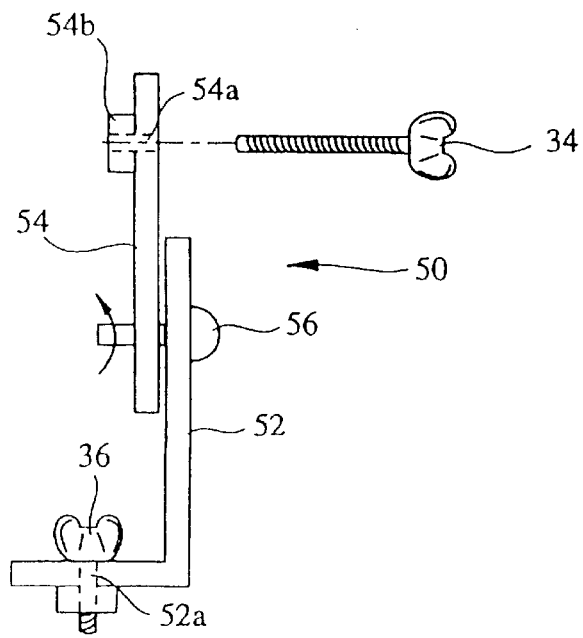
FIG. 11 is a side view showing modification of the bracket.

FIG. 11 shows one modification of the L-shaped bracket 40. In order to adjust the height of the second screw hole 54a in accordance with the height of the bolt hole of the flat tire 30, the bracket 50 (the modification) has an L-shaped member 52, and a plate-shaped elongated member 54 which is threadably engaged with a screw hole formed in the upper portion of the vertical section of the L-shaped member 52 through a bolt 56. Namely, the plate-shaped elongate member 54 is pivotably secured by the bolt relative to the L-shaped member 52 so as to adjust the height of the second screw hole 54a, and is fixedly secured. The plate-shaped elongated member 54 has the second screw hole 54a. A nut 54b (with a screw hole) is welded to the back of the second screw hole 54a to provide a threaded support. The first screw hole 52a is formed in the horizontal section of the L-shaped member 52.

By using the bracket 50, the flat tire 30 is fixed as follows: First, with one of the bolt holes of the flat tire set in alignment with the position of the threaded member 34, the plate-shaped elongated member 54 is turned suitably, so that the threaded member 34 is threadably engaged with the one bolt hole of the flat tire 30 and the second screw hole 54a. With the bracket 50, the flat tire 30 can be fixedly secured to the vehicle body floor irrespective of the height of the bolt hole of the flat tire 30.

Figure 12:
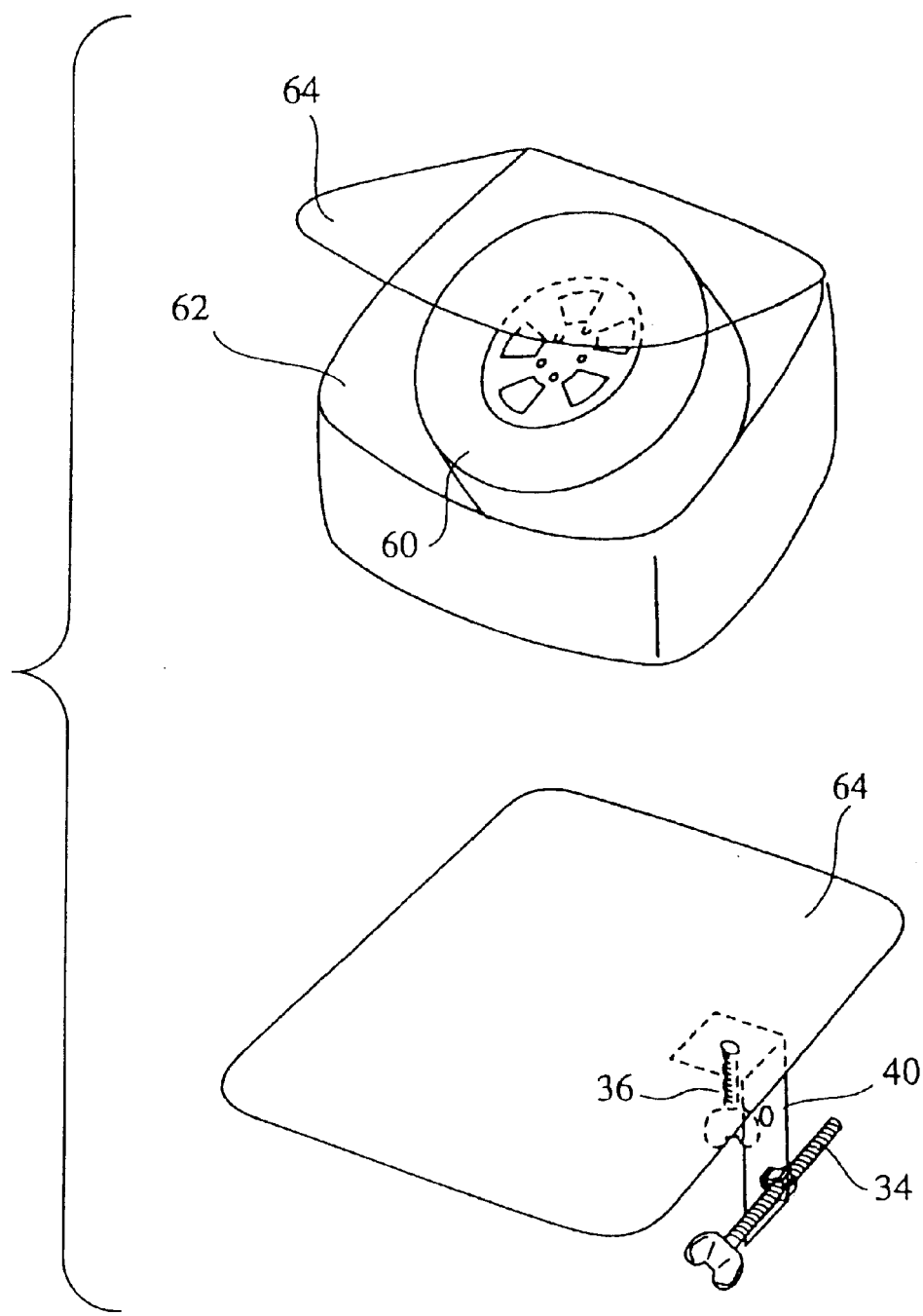
FIG. 12 is a perspective view showing the bracket and the threaded member which are provided in the spare tire accommodating space.

In the case of FIG. 12, the L-shaped bracket 40 and the threaded member 34 are provided in the spare tire accommodating space. In this case, in order to decrease the volume of the accommodating space 62 as much as possible, an L-shaped bracket 40 adapted to hold the threaded member 34 is secured to the rear surface of the lid member 64 of the accommodating space 62 with a screw 36, and, below the spare tire 60, a flat tire accommodating plastic bag 32 is accommodated. It goes without saying that the L-shaped bracket 40 and the threaded member 34 may be fixed on surfaces other than the rear surface of the lid member 64. In another preferred embodiment, the spare tire accommodating space is provided behind the second seat.

As was described in detail, with the flat tire fixing device of the invention, the threaded member is threadably engaged directly with the vehicle body screw hole, or it is engaged with the L-shaped bracket which is secured to the vehicle body with the screw. Hence, both in the case where the bucket seat is accommodated and in the case where it is set raised, with one of the bolt holds of the flat tire set in alignment with the screw hole which is formed in the vehicle body or the bracket the threaded member is threadably engaged therewith, then the flat tire can be fixed readily and positively. Hence, during the traveling of the automobile, the flat tire is completely prevented from being unsteady while rattling.

The present invention is based on Japanese Patent Application No. Hei. 10-187906, which is incorporated herein by reference.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A flat tire fixing device for fixing a flat tire in an automobile which has a seat accommodating space in which a folded seat is accommodated, said flat tire fixing device comprising:

a screw hole member operable to be disposed on a body of said automobile and located near a front edge of said seat accommodating space;

a flat tire fixing screw insertable into a bolt hole of said flat tire for fixing said flat tire relative to said body of said automobile;

a substantially L-shaped bracket including a horizontal section with a first screw hole and a vertical section with a second screw hole; and a bracket fixing member for fixing said L-shaped bracket relative to said body of said automobile, wherein said flat tire fixing screw inserted into said bolt hole of said flat tire is engageable with said screw hole member for fixing said flat tire when said seat is accommodated in said accommodating space, wherein said L-shaped bracket is fixed to said screw hole member by engaging said first screw hole with said screw hole member through said bracket fixing member, and said flat tire fixing screw inserted into said bolt hole of said tire is engageable with said second screw hole for fixing said flat tire when said seat is not accommodated in said accommodating space, and wherein said L-shaped bracket includes a holding member for holding said flat tire fixing screw, and said holding member includes a hole provided on said vertical section of said L-shaped bracket and a holding arm fixedly inserted in said hole and having a substantially C-shaped portion for gripping said flat tire fixing screw.

2. The flat tire fixing device according to claim 1, wherein at least one of said flat tire fixing screw and said bracket fixing member includes a wing bolt.

3. A flat tire fixing device for fixing a flat tire in an automobile which has a seat accommodating space in which a folded seat is accommodated, said flat tire fixing device comprising a screw hole member operable to be disposed on a body of said automobile and located near a front edge of said seat accommodating space;

a flat tire fixing screw insertable into a bolt hole of said flat tire for fixing said flat tire relative to said body of said automobile;

a substantially L-shaped bracket including a horizontal section with a first screw hole and a vertical section with a second screw hole; and a bracket fixing member for fixing said L-shaped bracket relative to said body of said automobile, wherein said flat tire fixing screw inserted into said bolt hole of said flat tire is engageable with said screw hole member for fixing said flat tire when said seat is accommodated in said accommodating space, wherein said L-shaped bracket is fixed to said screw hole member by engaging said first screw hole with said screw hole member through said bracket fixing member, and said flat tire fixing screw inserted into said bolt hole of said tire is engageable with said second screw hole for fixing said flat tire when said seat is not accommodated in said accommodating space, and wherein said L-shaped bracket includes an L-shaped member having said horizontal section and said vertical section and a plate-shaped member pivotably secured to said L-shaped member.

4. The flat tire fixing device according to claim 3, wherein at least one of said flat tire fixing screw and said bracket fixing member includes a wing bolt.

* * * * *